United States Patent
Thiessen et al.

(10) Patent No.: US 12,459,418 B2
(45) Date of Patent: Nov. 4, 2025

(54) SIGNAL LIGHT DISPLAY AND ENVIRONMENT DETECTION BY MEANS OF THE SAME DEVICE

(71) Applicant: Volkswagen Aktiengesellschaft, Wolfsburg (DE)

(72) Inventors: Eugen Thiessen, Bad Rothenfelde (DE); Roman Danov, Hannover (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 1037 days.

(21) Appl. No.: 17/518,394

(22) Filed: Nov. 3, 2021

(65) Prior Publication Data

US 2022/0134940 A1    May 5, 2022

(30) Foreign Application Priority Data

Nov. 3, 2020  (DE) .......................... 102020213826.5

(51) Int. Cl.
   *G02B 5/20*  (2006.01)
   *B60Q 1/00*  (2006.01)
   (Continued)

(52) U.S. Cl.
   CPC ............ *B60Q 1/0023* (2013.01); *B60Q 1/34* (2013.01); *G01S 17/10* (2013.01); *G01S 17/86* (2020.01);
   (Continued)

(58) Field of Classification Search
   CPC ......... B60Q 1/0023; B60Q 1/34; G01S 17/10; G01S 17/86; G01S 17/931; G01S 7/4817;
   (Continued)

(56) References Cited

U.S. PATENT DOCUMENTS 10,429,556 B2    10/2019   Rosenberg et al.
11,060,681 B2    7/2021    Erdl et al.
(Continued)

FOREIGN PATENT DOCUMENTS

CN    103718068 A    4/2014
CN    108474853 A    8/2018
(Continued)

OTHER PUBLICATIONS

Corresponding Chinese Application No. 202111293013.9. Office Action (Apr. 24, 2024).

*Primary Examiner* — Bumsuk Won
*Assistant Examiner* — John Curtis Sipes

(57) ABSTRACT

A device for signal light display and environment detection includes a first light source for emitting visible light in a first spectral range in a temporally modulated manner, and a light source for emitting invisible light in a second spectral range. A lighting surface is designed to reflect and/or transmit light in the first spectral range in a diffused manner. A material layer is transparent for light in the second spectral range, or reflects this light with almost no diffusion. A deflection unit in the device deflects the light from the first light source onto the lighting surface and the light from the second light source onto the material layer. The material layer is located in relation to the deflection unit such that invisible light deflected onto the material layer is emitted for environment detection in an environment of the device.

20 Claims, 3 Drawing Sheets

(51) Int. Cl.
*B60Q 1/34* (2006.01)
*G01S 17/10* (2020.01)
*G01S 17/86* (2020.01)
*G02B 5/28* (2006.01)
*G01S 17/931* (2020.01)

(52) U.S. Cl.
CPC .............. *G02B 5/208* (2013.01); *G02B 5/28* (2013.01); *G01S 17/931* (2020.01)

(58) Field of Classification Search
CPC ........ G02B 5/208; G02B 5/28; G02B 26/123; F21S 43/13; F21S 43/235; F21S 43/26; F21S 43/31; F21S 43/40; G01N 21/255
See application file for complete search history.

(56) References Cited

U.S. PATENT DOCUMENTS

| | | | |
|---|---|---|---|
| 11,208,035 | B2 | 12/2021 | Erdl et al. |
| 2005/0278098 | A1* | 12/2005 | Breed ................. G01S 7/023 701/45 |
| 2008/0040004 | A1* | 2/2008 | Breed ................. G01S 7/023 701/45 |
| 2016/0359235 | A1* | 12/2016 | Driscoll ............... H01Q 15/148 |
| 2020/0081129 | A1* | 3/2020 | de Mersseman .... G02B 26/105 |
| 2020/0284882 | A1* | 9/2020 | Kirillov ................ G01S 7/4817 |
| 2021/0018617 | A1* | 1/2021 | Iwase .................... G01S 15/62 |
| 2022/0229183 | A1* | 7/2022 | Chang .................. G01S 7/486 |
| 2022/0333757 | A1* | 10/2022 | Li ......................... F21S 41/147 |

FOREIGN PATENT DOCUMENTS

| | | |
|---|---|---|
| CN | 110062863 A | 7/2019 |
| CN | 111033114 A | 4/2020 |
| DE | 102017001061 A1 | 11/2017 |
| DE | 102017109905 A1 | 11/2018 |
| DE | 102017218683 A1 | 4/2019 |
| DE | 102017131012 B3 | 6/2019 |
| DE | 102019131155 A1 | 10/2020 |
| WO | 2020025089 A1 | 2/2020 |

* cited by examiner

SIGNAL LIGHT DISPLAY AND ENVIRONMENT DETECTION BY MEANS OF THE SAME DEVICE

CROSS REFERENCE TO RELATED APPLICATION

The present application claims priority to German Patent App. No 10 2020 213 826.5, to Thiessen, et al., filed Nov. 3, 2020, the contents of which is incorporated by reference in its entirety herein.

FIELD OF TECHNOLOGY

The present disclosure relates to devices for displaying signal lights and environment detection, and a corresponding method for displaying signal lights and environment detection, and a motor vehicle.

BACKGROUND

Partially or fully automatic driving functions and autonomous driving are becoming increasingly more important. To enable these functions, it is necessary to integrate more sensor systems in motor vehicles, and to potentially make them redundant for safety purposes. In particular, lidar systems are of great importance in this regard, but are also normally a major cost factor.

There is also the question of where lidar systems are to be located in or on the motor vehicle. Some lidar systems are mounted visibly on the outside, on the roof or body of the vehicle. This is disadvantageous for both aesthetic as well as aerodynamic reasons. In some vehicles such as pickup trucks or light utility vehicles, there is very little installation space for sensor systems such as lidar systems in which they could remain concealed. This is particularly the case in the rear of the vehicle. On the other hand, motor vehicles need certain devices for displaying signal lights, such as taillights. These devices likewise require installation space.

A vehicle headlamp with a lidar module is described in WO 2020/025089 A1. This involves emitting visible and ultraviolet or infrared light by means of a light guide with a wavelength-dependent refractive index into the same area. This enables both a lidar measurement as well as illumination of the area in front of the vehicle.

SUMMARY

Based on this, aspects of the present disclosure are to produce improvements with which environment detection can be obtained with the same device that is used for displaying signal lights, thus reducing costs and saving space.

Some aspects are addressed with subject matter of the independent claims. Other aspects and advantageous developments are addressed with the subject matter of the dependent claims.

The present disclosure is generally is based on the idea of using the same deflection unit for deflecting temporally modulated visible light onto a lighting surface that diffuses this light, as well as for deflecting invisible light onto a material layer, which can then emit this invisible light without any substantial diffusion.

This improved configuration results in a device for displaying signal lights as well as for environment detection. The device may have a first light source that is configured to emit visible light in a first spectral range, and a second light source configured to emit invisible light in a second spectral range. The device may also have a lighting surface that is designed to reflect and/or transmit light in the first spectral range in a diffused manner. The device may also have a material layer that is at least nearly transparent for the light in the second spectral range, or is configured to reflect light in the second spectral range with almost no diffusion. The device may further have a deflection element located in particular in relation to the first light source and the second light source, and is configured to deflect the visible light from the first light source toward the lighting surface, and the invisible light from the second light source toward the material layer, wherein the device is controlled in particular by a control unit for the device. The material layer may be located in relation to the deflection unit and the second light source such that the invisible light deflected onto the material layer is emitted from the device for detecting the environment of the device. The control unit may be configured to control the first light source such that it emits visible light in a modulated manner, thus displaying a light signal on the lighting surface composed of the visible light deflected toward the lighting surface.

In some examples, the device may be configured with a detection unit that is designed to detect light from the second spectral range, and generate at least one detection signal for environment detection on the basis of the detected light.

In some examples, the deflection unit may be located in relation to the detection unit, in particular in relation to an active surface in the detection unit, such that the deflection unit can deflect the portion of the invisible light reflected in the environment of the device onto the active surface in the detection unit.

The deflection unit, along with the second light source, the detection unit, and the control unit may operate as a lidar system. The control unit may be coupled to the detection unit, to receive the at least one detection signal that is generated by the detection unit on the basis of the reflected portion of the invisible light that is detected. The control unit can determine the distance to the reflecting object on the basis of the detection signals, in particular on the basis of a time-of-flight measurement. The sensor unit can also determine an azimuth angle and a polar angle of the incident reflected portion of the invisible light through the spatial location of the active surface, in particular in relation to the deflection unit, and the current position of the deflection unit, such that corresponding three dimensional coordinates can be determined in a spherical coordinate system.

Furthermore, the deflection unit along with the lighting surface and the control unit, as well as the first light source, may be configured to form a signal light display device.

According to at least one example, the first light source includes at least one first laser diode.

By using the first laser diode, which emits spatially high-grade coherent light for example, in conjunction with the temporally modulated emission of the visible light, the light signal can be affected and implemented in a particularly precise and flexible manner on the lighting surface, such that complex and potentially time-dependent patterns, including text signals, can be generated as light signals.

In some examples, the second light source includes at least one second laser diode.

The laser diode may be configured where the first spectral range lies within a wavelength range of 380 nm to 780 nm, or, more specifically, within a wavelength range of 570 nm to 780 nm, or within a wavelength range of 640 to 780 nm.

The visible light can be emitted in particular as white light, red light, yellow light, or orange light, and therefore be used in a flexible manner in the automotive context.

In some examples, the second spectral range may lie within a wavelength range of 800 nm to 3 µm, i.e., in the near-infrared range. By way of example, the second spectral range can lie within a wavelength range of 1 µm to 3 µm, or within a wavelength range of 1.2 µm to 3 µm, or within a wavelength range of 2 µm to 3 µm.

In some examples, a method is disclosed for displaying a signal light and environment detection by means of the same device is also specified herein. According to the method, visible light in a first spectral range is emitted by means of a first light source in the device, and invisible light in a second spectral range is emitted by means of a second light source in the device. The visible light emitted by the first light source is deflected in particular by means of a deflection unit in the device onto a lighting surface in the device, which is designed to reflect and/or transmit light in the first spectral range in a diffused manner.

The invisible light emitted by means of the second light source may be deflected in particular by means of the deflection unit onto a material layer that is, at least nearly transparent for light in the second spectral range, or is designed to reflect light in the second spectral range with almost no diffusion. The invisible light deflected onto the material layer may be used for detecting an environment of the device. The first light source is activated to emit visible light in a temporally modulated manner, in particular by a control unit in the device, in order to display a light signal on the lighting surface by means of the visible light deflected onto the lighting surface.

Other embodiments of the method can be derived directly from the various embodiments of the device disclosed herein and the motor vehicle, and vice versa. In particular, a device according to the improved concept can be designed to execute a method according to the present disclosure, or the device executes such a method.

The present disclosure also includes the combination of features in the embodiments described herein.

BRIEF DESCRIPTION OF THE DRAWINGS

Exemplary embodiments of the present disclosure shall be described below. In the figures.

DETAILED DESCRIPTION

Figure 1:
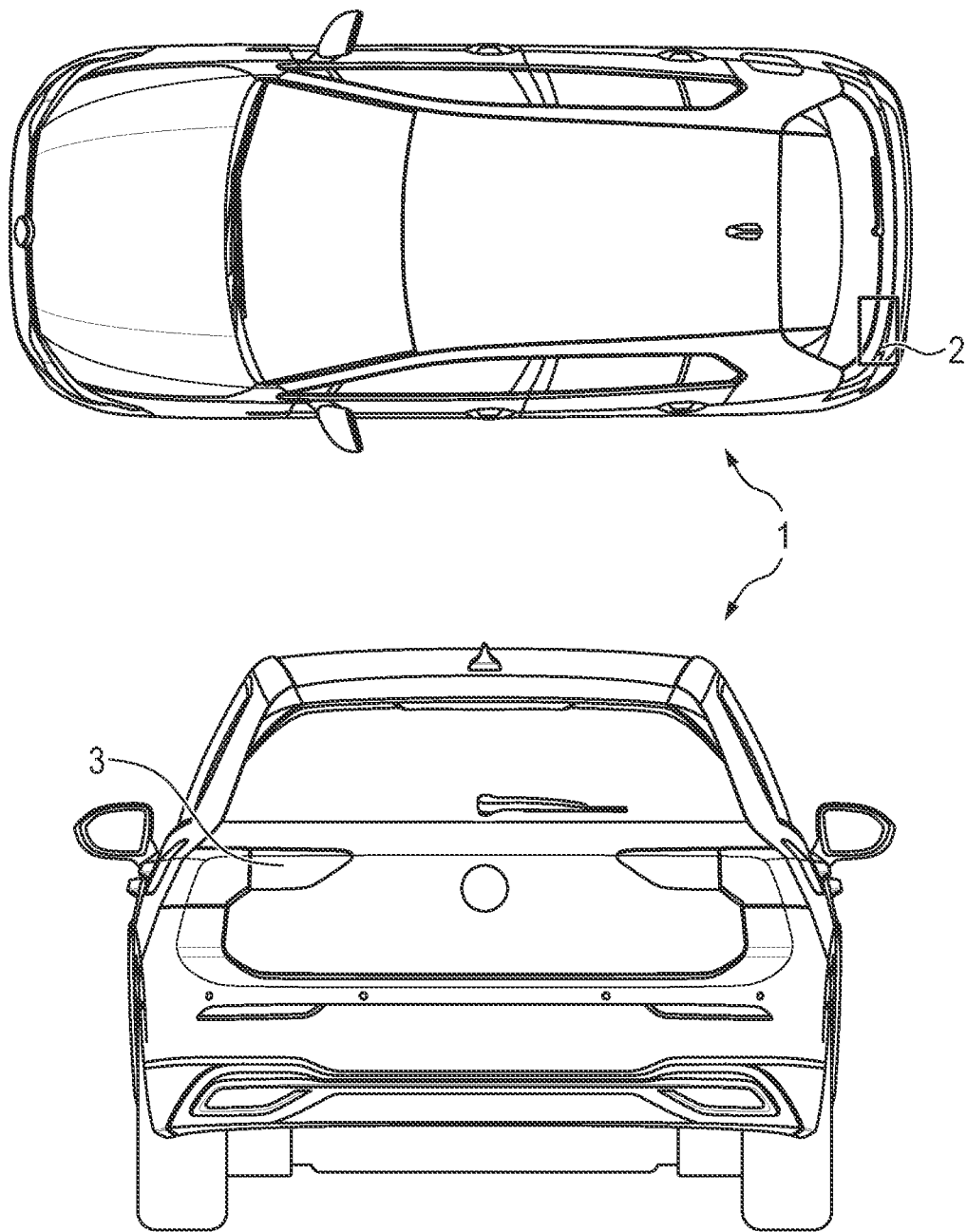
FIG. 1 shows a schematic illustration of a motor vehicle including a device under some aspects of the present disclosure.

Visible light can be understood to be electromagnetic radiation with a wavelength ranging from 380 nm to 780 nm. Invisible light can be understood to be ultraviolet or infrared light, e.g., electromagnetic radiation with a wavelength ranging from 100 nm to 380 nm, or from 780 nm to 50 µm, respectively.

The invisible light may be configured as infrared light having a wavelength in the range of 780 nm to 3 µm, i.e. the near-infrared range, in particular with a wavelength ranging from 780 nm to 2 µm. More preferably, the wavelength of the invisible light is also greater than or equal to 850 nm, enabling a slight separation from visible red light.

The visible and invisible light emitted from the first and second light sources, can be emitted in a pulsed or modulated manner, for example.

The fact that the lighting surface is designed to reflect or transmit the light in the first spectral range in a diffused manner relates in particular to the material or structural properties of the lighting surface, independently of whether or not the light is actually emitted from the first light source. Likewise, the fact that the material layer for the light from the second spectral range is at least nearly transparent, or reflects this light with almost no diffusion, relates to material or structural properties of the material layer, independently of whether or not the light is actually emitted from the second light source.

As used herein, light that is emitted specifically from the first light source or second light source, will be referred to as "the emitted" visible or invisible light.

The material layer for the light may be part of the lighting surface or separate therefrom, depending on the configuration of the device. If it is part of the lighting surface, the material layer can be configured to reflect and/or transmit the light in the first spectral range in a diffused manner. Alternatively, there can be a second material layer in the lighting surface, and/or the second material layer can be formed in combination with the first material layer.

The fact that the lighting surface may be configured to reflect and/or transmit light in the first spectral range in a diffused manner can also be expressed in that the lighting surface contains an optical diffusion element for the light in the first spectral range. The material layer can then be the diffusion element or it can be separate therefrom.

Transparence in relation to a wavelength range or spectral range can be understood herein to mean that property of a material that allows light with a wavelength in this range to be substantially fully transmitted, at least within a specific angle of incidence range, wherein the transmitted light is subject to Snell's law of refraction at the macroscopic level. In other words, the degree of transmission for the material layer, if it is at least nearly transparent for the light in the second spectral range, is at least nearly equal to 1 for light in the second spectral range, at least within a specific angle of incidence range, and the light is subject to Snell's law of refraction. The degree of transmission can be greater than or equal to 0.9 in this case, e.g., greater than or equal to 0.95, preferably greater than or equal to 0.99.

If the material layer is configured to reflect light in the second spectral range with almost no diffusion, this can be understood to mean that that portion of the light in the second spectral range that is reflected by the material layer is subject to the law of reflection at the macroscopic level, according to which the angle of reflection is equal to the angle of incidence. A higher portion of the incident light is also reflected here by the material layer, such that the degree of reflection is greater than or equal to 0.5, preferably greater than or equal to 0.8, e.g., greater than or equal to 0.9, at least within a specific angle of incidence range.

The fact that the lighting surface may be designed to reflect or transmit light in the first spectral range in a diffused manner can be understood in particular to mean that the law of reflection, or Snell's law of refraction does not apply to the light in the first spectral range at the macroscopic level.

This can apply to translucent materials, for example, which are not transparent. It should be noted that the thickness of the lighting surface and the corresponding material layer or second material layer may also be relevant with regard to the properties relating to diffused transmission. As a result, material with a thickness of a few micrometers or less may be translucent for light in the first spectral range, although it may be opaque for the same light when it is significantly thicker. If these types of materials are used for the lighting surface, the thickness is selected depending on the material that is used and the concrete first spectral range.

The control unit described herein may be configured to also control the second light source to emit the invisible light, e.g., for temporally modulated emission or pulsed emission of the invisible light.

The control unit can also control the deflection unit, for example, to deflect the emitted visible light or the emitted invisible light in a controlled manner toward the lighting surface or the material layer.

The invisible light may be deflected, i.e., emitted, from the device into the environment by the material layer, where it can be reflected in part by objects in the environment. The reflected portion can be reflected back toward the device and detected by a detection unit for the environment detection.

The light signal obtained at the lighting surface may form the signal light display. The light signal can form a static or temporally changing symbol or pattern on the lighting surface, in particular a two-dimensional symbol or pattern. In this manner, the light signal or signal light display can be used to transmit information outside the device, or for external communication, in other words. In particular, the signal light display is different than a function used to illuminate the environment of the device or a motor vehicle, e.g., a headlamp, in particular a headlamp for the motor vehicle.

The deflection unit may serve as a common deflection unit for both the signal light display and the environment detection according to the improved concept, i.e., for deflecting both the visible light emitted from the first light source and the invisible light emitted from the second light source. The deflection of the emitted visible light and the emitted invisible light can take place simultaneously or in a temporally offset manner, depending on how the light sources are activated.

By way of example, the visible light and the invisible light emitted from the first and second light sources toward the deflection unit can be at least partially conducted along the same light path.

By using the same deflection unit, and potentially the same light path, the signal light display and the environment detection can be obtained with the same device, thus reducing the necessary installation space. This use of the same design and components also reduces costs. By designing the lighting surface and the material layer in the manner described above, it is also possible to use the visible light and the invisible light for different purposes, specifically for lighting the lighting surface and the external environment, respectively.

In some examples, the device may be configured with a light guide located between the first light source and the deflection unit as well as between the second light source and the deflection unit, in order to conduct the visible light emitted from the first light source and the invisible light emitted from the second light source along the same light path.

The light guide may include one or more lenses, dichroitic elements, or dichroitic mirrors, waveguides, optical fibers, etc.

In some examples, conducting the invisible light and the visible light along the same light path, the deflection unit can collectively deflect the visible and invisible light, thus simplifying control of the deflection unit. This use of a common light path also reduces the installation space that is needed.

Regarding the laser diodes, the selection of a second spectral range depends on the material used for the material layer, or vice versa, in order to ensure that the conditions described above are satisfied. Materials that can be used for the material layer are, depending on the embodiment of the device, materials that are substantially transparent for infrared light, e.g., silicon, germanium, gallium arsenide, or so-called AMTIR materials, in particular AMTIR-1, -2, -3, -4 or -5. AMTIR-1 is a compound according to the stochiometric composition G333As12Se55. AMTIR-2, -4, and -5 are compounds corresponding to the stochiometric composition AsxSex. AMTIR3 is a compound having the stochiometric composition GexSbxSex.

These AMTIR compounds are substantially transparent for infrared light in the wavelength range of 1 µm to 3 µm and higher. AMTIR-1 is also substantially transparent for infrared light with wavelengths of 800 nm to 1 µm. Gallium arsenide is substantially transparent for infrared light with wavelengths of 1 µm to 3 µm and higher, silicon is substantially transparent for infrared light with wavelengths of 1.2 µm to 3 µm and higher, and germanium is substantially transparent for infrared light with wavelengths in the range of 2 to 3 µm and higher.

In some examples, metals such as gold, silver or chrome can be used for the material layer. The material layer can also be designed as an interference filter or as a two-dimensional metamaterial in various embodiments.

In some examples, the deflection unit may include a pivoting mirror, e.g., a mirror configured as a microelectromechanical system, MEMS, or a rotating mirror, in particular a rotating polygon mirror, or a Risley prism assembly.

In some examples, the lighting surface includes the material layer, or the lighting surface is made of the material layer. The material layer is substantially nearly transparent for light in the second spectral range, and is designed to transmit light in the first spectral range in a diffused manner.

In these examples, the material layer can include silicon, germanium, gallium arsenide, or one of the aforementioned AMTIR materials, or be made thereof. The thickness of the material layer is selected in particular such that light from the first spectral range is at least partially diffused. By way of example, the thickness of the layer can be selected such that the degree of transmission for light in the first spectral range is greater than or equal to 0.5, preferably greater than or equal to 0.8, e.g., greater than or equal to 0.9.

These examples have the advantage that there only needs to be one material layer, which functions as both the lighting surface and the for emitting the invisible light. This results in a particularly small installation space, and savings in terms of costs.

In some examples, the material layer is designed to reflect light in the second spectral range with almost no diffusion, and the light surface includes a second material layer. The second material layer is on a side of the material layer facing the deflection unit, and is in direct contact with the material layer, for example. The second material layer is also at least nearly transparent for light in the second spectral range, and is designed to reflect and/or transmit light in the first spectral range in a diffused manner.

Accordingly, visible light emitted by the first light source and deflected by the deflection unit is reflected and/or transmitted by the second material layer in a diffused manner, wherein the visible light can also be at least partially reflected at a boundary surface between the second material layer and the first material layer. In particular, light transmitted by the second material layer in a diffused manner is reflected by the first material layer, and then transmitted in a diffused manner by the second material layer.

The invisible light emitted by the second light source and deflected by the deflection unit is transmitted with nearly no interference, due to the transparence of the second material layer, and strikes the underlying material layer, at which it is reflected with almost no diffusion.

In these embodiments, the material layer can include a metal layer, such as a gold layer, silver layer or chrome layer, or it can be composed thereof. The second material layer can include or be composed of silicon, germanium, gallium arsenide, or one of the AMTIR materials described above. The thickness of the second material layer is determined in a manner analogous to that described in this context for the first material layer.

In some examples, the material layer is designed to reflect light in the second spectral range with almost no diffusion, and the material layer is at least nearly transparent for light in the first spectral range. The lighting surface includes a second material layer, or is composed of the second material layer, and this second material layer is on a side of the first material layer facing away from the deflection unit and is designed to reflect and/or transmit light in the first spectral range in a diffused manner.

The first and second material layers can be in direct contact or spatially separated from one another. As explained above, in these embodiments, the second material layer can be designed as a thin layer or composed of silicon, germanium, gallium arsenide, or an AMTIR material.

In these embodiments a mirror layer can optionally be located on a side of the second material layer facing away from the first material layer, which is designed to entirely or substantially entirely reflect light in the first spectral range.

In this case, the visible light emitted by the first light source and deflected by the deflection unit strikes the material layer, from which it is nearly entirely transmitted due to the transparency thereof, and is then reflected and/or transmitted in a diffused manner by the underlying second material layer, and some transmitted portions thereof can then be reflected by the mirror layer in these embodiments. The invisible light emitted by the second light source and deflected by the deflection unit is reflected by the material layer with almost no diffusion, and in particular, is substantially entirely reflected.

The material layer can be designed in some examples as an interference mirror, or it can include a metamaterial, in particular a two-dimensional meta-surface.

Metamaterials are known that act in the manner described herein, specifically such that they act substantially as mirrors for infrared light, and are substantially transparent for visible light. For this, the use of monolayers composed of randomly distributed silver nanoplates with a thickness of approx. 10 nm is specified.

In some examples, a motor vehicle is also disclosed that has a device for displaying signal lights and detecting the environment according to the improved concept.

According to at least one example of the motor vehicle, the motor vehicle has a rear light, and the device is integrated in the rear light.

The examples described herein are preferred exemplary embodiments of the present disclosure. The components described in the exemplary embodiments each represent individual features of the present disclosure to be regarded independently of one another, which each develop the present disclosure independently of one another, and are therefore also to be regarded individually or in combinations other than those shown as part of the present disclosure. Furthermore, the exemplary embodiments described herein can also be supplemented by other features of the present disclosure already described herein.

Elements having the functions have the same reference symbols in the figures.

A motor vehicle 1 is schematically illustrated in FIG. 1, which has an exemplary embodiment of a device 2 for signal light display and environment detection according to aspects of the present disclosure. The device 2 can be integrated in a rear light 3 in the motor vehicle 1, by way of example. Exemplary embodiments of the device 2 shall be explained in greater detail below in reference to FIGS. 2 to 4.

Figure 2:
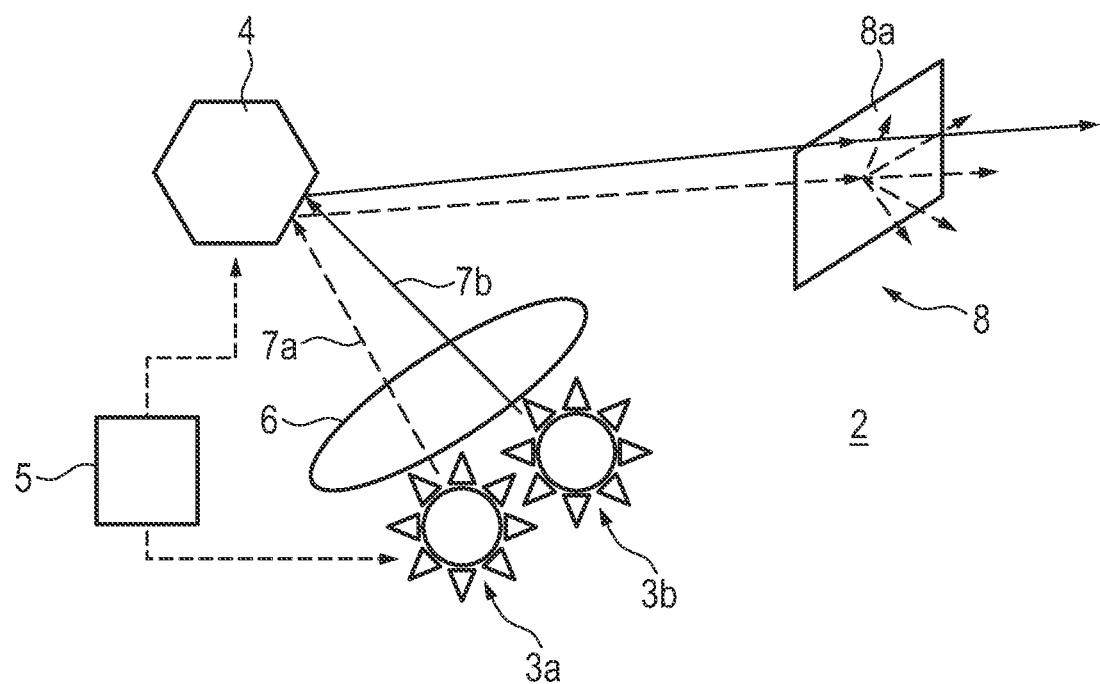
FIG. 2 shows a schematic illustration of another example of a device under some aspects of the present disclosure.

An exemplary embodiment of a device for displaying signal lights and detecting an environment according to the improved concept is shown schematically in FIG. 2.

The device 2 has a first light source 3a and a second light source 3b, each of which includes one or more laser diodes, by way of example. The device 2 has a control unit 5, which can control the light sources 3a, 3b, such that they emit light, e.g., pulsed or temporally modulated light. The first light source 3a is designed to emit visible light 7a in a first spectral range, e.g., red light, and the second light source 3b is designed to emit invisible light in a second spectral range, e.g., infrared light 7b.

The device 2 also has a lighting surface 8, which includes a material layer 8a, and is located in the beam path for the visible light 7a and the beam path for the invisible light 7b. The device 2 has a deflection unit 4, e.g., a scanner mirror, which can be designed as a rotating polygon mirror or a pivoting mirror, such as a MEMS mirror, and is likewise located in the beam path for the visible light 7a and the invisible light 7b, in order to deflect the visible light 7a and the invisible light 7b onto the material layer 8a.

The device 2 can also have a light guide 6 located between the light sources 3a, 3b and the deflection unit 4, which is configured to conduct the visible light 7a and the invisible light 7b along the same light path, at least in part. This light guide can include glass fibers or other optical fibers, one or more dichroitic mirrors, one or more lenses, etc.

The material layer 8a is substantially transparent for the invisible light 7b. The invisible light 7b therefore passes through the material layer 8a with substantially no diffusion, after it is deflected by the deflection unit 4 toward this material layer 8a, which is located in the device 2, or the rear light 3, such that the invisible light 7b is emitted from the device 2 or the rear light 3 into the environment of the motor vehicle 1, or the device 2.

The invisible light 7b emitted into the environment of the motor vehicle 1 can be at least partially reflected by an object, for example, and the reflected portion of the invisible light 7b can be deflected back toward the device 2, where it can strike an optical detector (not shown), in particular after it has been deflected toward it by the deflection unit 4, which then generates one or more detection signals on the basis thereof, and sends them to the control unit 5. The control unit 5 can determine three dimensional coordinates for a point on the reflected object on the basis of the current position of the deflection unit 4, the position of the optical detector in relation to the deflection unit 4, and the time-of-flight for the invisible light 7*b*. In this manner, the device 2 implements an environment detection according to the principles of a lidar system.

Figure 5:
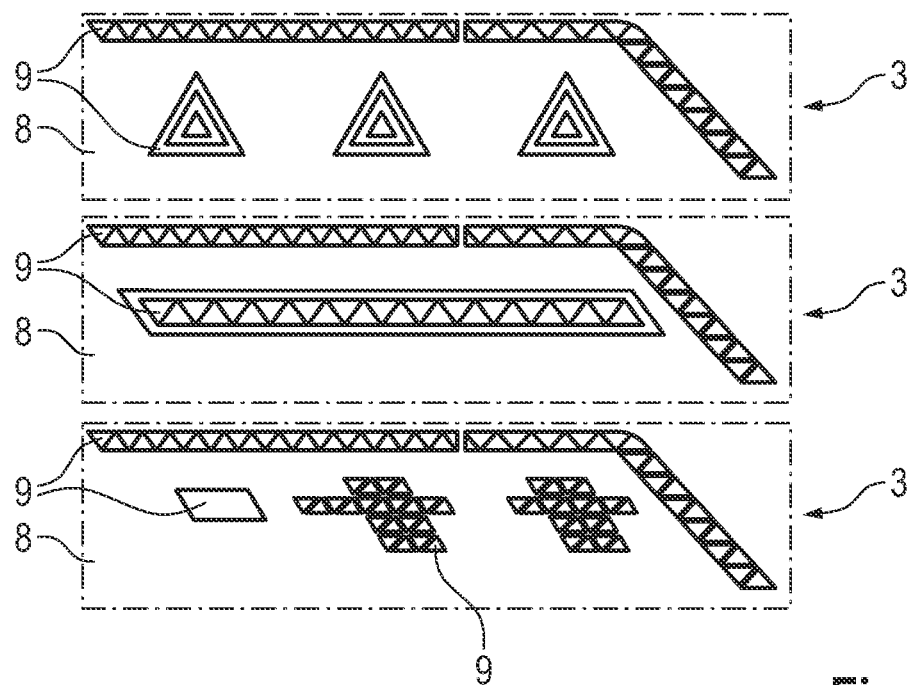
FIG. 5 shows various exemplary illustrations of a rear light in a motor vehicle that includes a signal light display under some aspects of the present disclosure.

The material layer 8 is also configured to transmit the visible light in a diffused manner. The visible light 7*a* therefore exits the material layer 8*a* in a diffused manner, and generates a bright point on the lighting surface 8, or the material layer 8*a*. The control unit 5 can control the first light source 3*a* such that it temporally modulates the visible light 7*a*, and emits this light in coordination with the movement of the deflection unit 4, such that a light signal 9 can be displayed on the material layer 8*a* serving as the display screen. Signal functions such as brake lights, tail lamps, turn signals, backup lights, etc. can be obtained in this manner. Furthermore, complex patterns or text or other symbols can also be displayed, which can be used for external communication. Examples thereof are schematically shown in FIG. 5.

The material layer 8*a* can be in the form of a thin plate, or a coating on a surface, e.g., a glass or plastic surface. A semiconductor material such as silicon, germanium, or gallium arsenide can be used as the material for the material layer 8*a*, because these materials are substantially transparent for infrared light in the corresponding wavelength ranges. These materials are translucent and diffuse visible light, thus acting as optical diffusors, if the material layer 8*a* is thin enough. Alternatively, so-called AMTIR materials ("Amorphous Material Transmitting Infrared Radiation") can be used, in particular AMTIR-1 to AMTIR-5. The concrete selection of the material depends on the wavelengths of the visible light 7*a* and invisible light 7*b* that are emitted.

Figure 3:
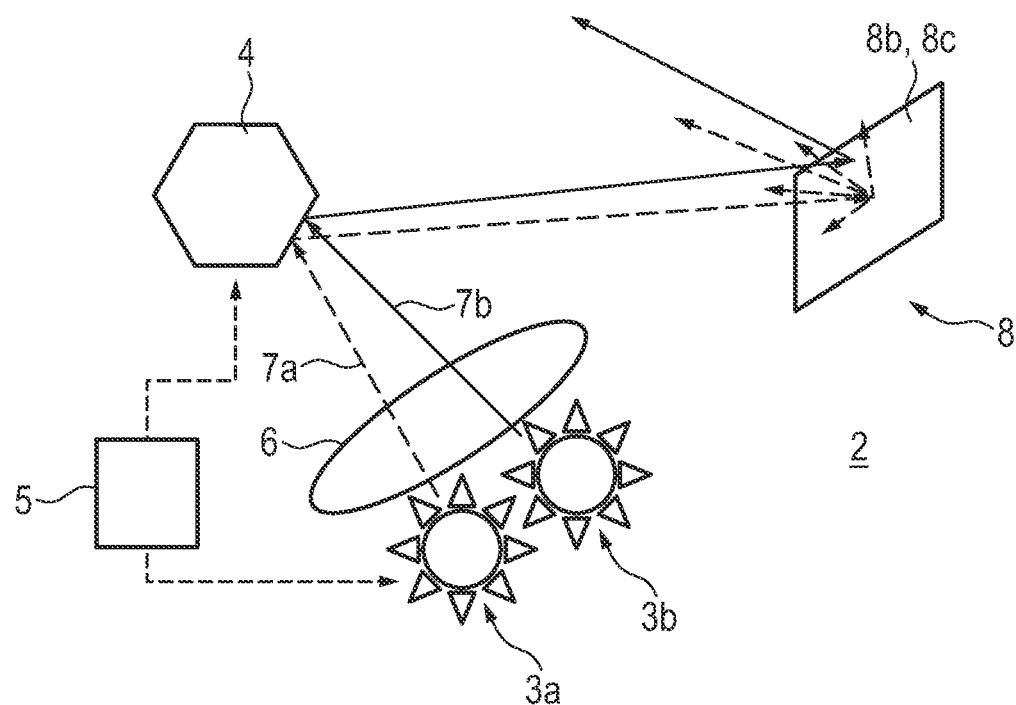
FIG. 3 shows a schematic illustration of a further example of a device under some aspects of the present disclosure.

Another exemplary embodiment of the device 2 is shown in FIG. 3, which is based on the device 2 in the embodiment in FIG. 2, and differs therefrom at least in terms of the structure of the lighting surface 8. The lighting surface 8 in FIG. 3 includes two material layers, a first material layer 8*b* and a second material layer 8*c*, which can be in direct contact to one another, for example. The first material layer 8*b* faces the deflection unit 4, and the second material layer 8*c* is on a side of the first material layer 8*b* facing away from the deflection unit 4.

The first material layer 8*b* is made of a material, for example, such as that used for the material layer 8*a* in FIG. 2. The second material layer 8*c* reflects both the visible light 7*a* and the invisible light 7*b*, wherein the second material layer 8*c* reflects the invisible light 7*b* with almost no diffusion. Because the first material layer 8*b* is substantially transparent for the invisible light 7*b*, this light is substantially reflected with no diffusion by the structure of the material layers 8*b*, 8*c*, while the visible light 7*a* is reflected in a diffused manner.

Analogously to that in FIG. 2, the diffused, reflected visible light 7*a* can therefore be used for displaying signal lights on the lighting surface 7, while the invisible light 7*b* can be emitted from the device 2 and used for environment detection.

In an alternative embodiment, the first material layer is substantially transparent for the visible light 7*a*, and reflects the invisible light 7*b* with substantially no diffusion. This can be obtained using interference reflectors or interference mirrors, also referred to as Bragg mirrors. In these embodiments, the second material layer 8*c* is made of a material such as that used for the material layer 8*a* in FIG. 2.

By way of example, a mirror layer (not shown) can be placed on a side of the second material layer 8*c* facing away from the first material layer 8*b*, which reflects the visible light 7*a*, such that the assembly of the lighting surface 8 on the whole substantially reflects the invisible light 7*b* with no diffusion, and reflect the visible light 7*a* in a diffused manner.

The first material layer 8*b* and second material layer 8*c* are not necessarily in direct contact with one another in the embodiments shown in FIG. 3, and instead can be spaced apart from one another.

Figure 4:
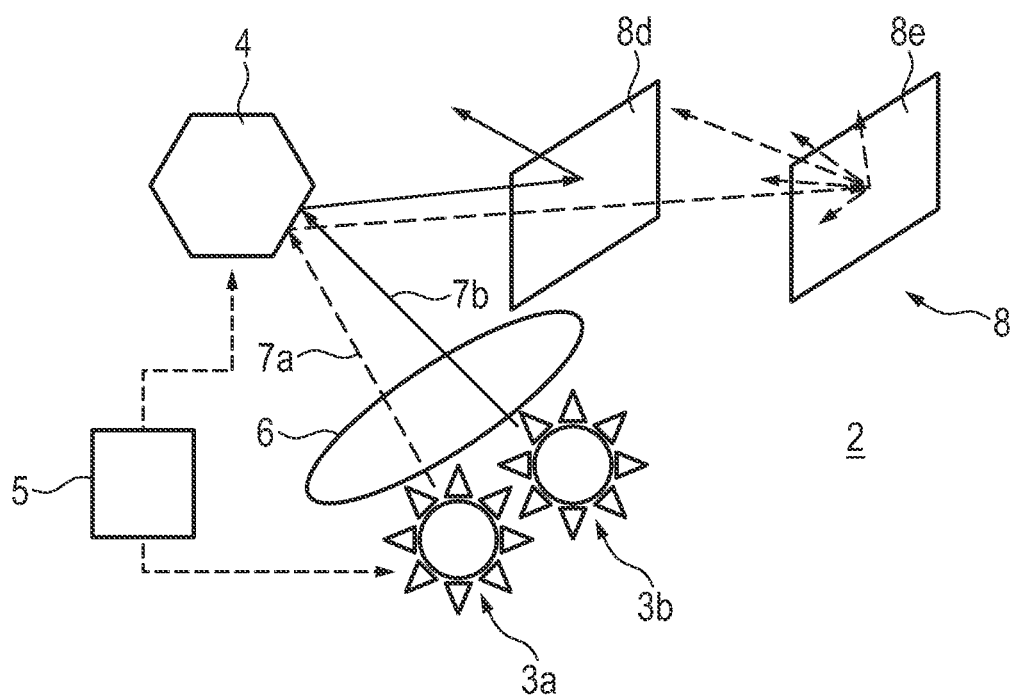
FIG. 4 shows a schematic illustration of a still further example of a device under some aspects of the present disclosure.

Another exemplary embodiment of the device 2 is schematically shown in FIG. 4, which is based on the device 2 in the embodiments shown in FIG. 2, and differs therefrom at least in terms of the structure of the lighting surface 8.

The device 2 has a first material layer 8*d* and a second material layer 8*e* in the embodiment shown in FIG. 4, wherein the first material layer 8*d* is located between the deflection unit 4 and the second material layer 8*e*. The material layers 8*d*, 8*e* can be spaced apart from one another, or in direct contact to one another.

The second material layer 8*e* is configured in the manner explained in reference to the material layer 8*a* in FIG. 2, wherein another mirror layer that reflects visible light 7*a* can be located on a side of the second material layer 8*e* facing away from the deflection unit 4, as explained in reference to FIG. 3.

The first material layer 8*d* is substantially transparent for visible light 7*a*, such that the visible light 7*a* can pass through the material layer 8*d* without interference, and can be reflected in a diffused manner by the second material layer 8*e*. The first material layer 8*d* is also configured such that the invisible light 7*b* is substantially reflected without diffusion. An interference reflector or Bragg mirror can therefore be used for the first material layer 8*d*, as explained in reference to the material layer 8*b* in FIG. 3.

Alternatively, a so-called metamaterial, in particular a two-dimensional metamaterial, also referred to as a metasurface, can be used, which exhibits the necessary properties. Plastic surfaces are specified in this context, which are coated with randomly distributed silver nanoplates, such that they form a mono-layer of silver plates, wherein the individual silver plates exhibit a thickness in the range of a few nanometers, e.g., 10 nm.

As explained above, in particular in reference to the drawings, an improved concept can be obtained using the same device for displaying signal lights and detecting the environment on the basis of concept of a lidar system, by means of which costs and installation space can be reduced. The displaying of the signal lights takes place on a lighting surface, e.g., a rear light for a motor vehicle, while the light for detecting the environment is emitted into the environment of the device.

The lighting surface can be made of a material for this that deflects visible light of at least one color, but transmits infrared light in a collimated manner. This can be achieved with plates that have a nano-structured surface, a so-called FSS ("frequency selective surface"), or distributed nanoparticles.

The lighting surface can be scanned by a light beam, which is diffused by one or more light modulation units, e.g., a scanning mirror. The modulation units can be configured, e.g., as galvo-scanners, micro-mirror arrays, (English: "Digital Mirror Device": DMD) or rotating polygon mirrors.

If the lighting surface is scanned with a defined visible wavelength, e.g., red light, and the light source is modulated accordingly, an arbitrary image can be displayed on the lighting surface. Alternatively or additionally, the diffused light acts as a signal function, e.g. a taillight, brake light, turn signal, etc.

The device can also emit collimated, invisible light pulses, e.g., infrared pulses, which are substantially without diffusion, such that the device can be used as a lidar. In addition to the advantages regarding installation space and costs, the integration of the signal function and the environment detection function can also improve the aerodynamics of the motor vehicle, or be used to obtain an aesthetic design.

LIST OF REFERENCE SYMBOLS 1 motor vehicle
2 device
3 rear light
4 deflection unit
5 diffusion unit
6 light guide
7a visible light
7b invisible light
3a, 3b light source
8 lighting surface
8a, 8b, 8c, 8d, 8e material layer

The invention claimed is:

1. A device for signal light display and environment detection, comprising:
    a first light source configured to emit visible light in a first spectral range, and a second light source that is configured to emit invisible light in a second spectral range;
    a lighting surface, within the device, configured to reflect and/or transmit light in the first spectral range in a diffused manner to form an automotive signal light;
    a material layer that is (i) at least substantially transparent for light in the second spectral range, or (ii) is configured to reflect light in the second spectral range with minimal diffusion;
    a deflection unit configured to deflect the visible light emitted from the first light source onto the lighting surface and deflect the invisible light emitted from the second light source onto the material layer, wherein the material layer is located in proximity to the deflection unit and the second light source such that the invisible light deflected onto the material layer is emitted for environment detection in the environment of the device; and
    a control unit, configured to control the first light source to temporally modulate the visible light in order to display a pattern or symbol as a light signal on the lighting surface using the visible light deflected onto the lighting surface by the deflection unit.

2. The device of claim 1, further comprising a light guide located between the first light source and the deflection unit and between the second light source and the deflection unit, the light guide being configured to conduct the visible light emitted from the first light source and the invisible light emitted from the second light source on a same light path.

3. The device of claim 1, further comprising a detection unit that is configured to detect light in the second spectral range, and generate at least one detection signal for environment detection on the basis of the detected light.

4. The device of claim 3, wherein the deflection unit is configured in relation to the detection unit in order deflect the reflected portion of invisible light emitted into the environment onto an active surface in the detection unit.

5. The device of claim 1, wherein the first light source comprises at least one first laser diode, and the second light source comprises at least one second laser diode.

6. The device of claim 1, wherein the first spectral range comprises a wavelength range of one of 380 nm to 780 nm, 570 nm to 780 nm, or 640 nm to 780 nm.

7. The device of claim 1, wherein the second spectral range lies within a wavelength range of one of 800 nm to 3 µm, 1 µm to 3 µm, 1.2 µm to 3 µm, or 2 µm to 3 µm.

8. The device of claim 1, wherein the deflection unit comprises one of a pivoting mirror, a rotating mirror, or a Risley prism assembly.

9. The device of claim 1, wherein the lighting surface comprises the material layer, wherein the material layer is at least substantially transparent for light in the second spectral range, and is configured to transmit light in the first spectral range in a diffused manner.

10. The device of claim 1, wherein
    the material layer is configured to reflect light in the second spectral range with minimal diffusion; and
    the lighting surface comprises a second material layer that is located on a side of the first material layer facing the deflection unit, wherein the second material layer is at least substantially transparent for light in the second spectral range, and is configured to reflect and/or transmit light in the first spectral range in a diffused manner.

11. The device of claim 1, wherein
    the material layer is configured to reflect light in the second spectral range with minimal diffusion;
    the material layer is at least substantially transparent for light in the first spectral range; and
    the lighting surface comprises a second material layer that is located on a side of the material layer facing away from the deflection unit, wherein the second material layer is configured to reflect and/or transmit light in the first spectral range in a diffused manner.

12. The device of claim 1, wherein the material layer is configured as an interference mirror or comprises a metamaterial.

13. A method for signal light display and environment detection in a device, comprising:
    emitting visible light in a first spectral range via a first light source;
    emitting invisible light in a second spectral range via a second light source;
    deflecting the visible light emitted from first light source onto a lighting surface within the device configured to reflect and/or transmit light in the first spectral range in a diffused manner to form an automotive signal light;
    deflecting the invisible light emitted from the second light source via a deflection unit onto a material layer that is at least substantially transparent for light in the second spectral range, or is configured to reflect light in the second spectral range with minimal diffusion;
    emitting the invisible light deflected onto the material layer for environment detection in an environment of the device; and
    controlling the first light source to emit the visible light in a temporally modulated manner, in order to display a pattern or symbol as a light signal on the lighting surface using the visible light deflected onto the lighting surface.

14. The method of claim 13, further comprising conducting the visible light emitted from the first light source and the invisible light emitted from the second light source on a same light path via a light guide located between the first light source and the deflection unit and between the second light source and the deflection unit.

15. The method of claim 13, further comprising deflecting the reflected portion of invisible light emitted into the environment onto an active surface in the detection unit.

16. The method of claim 13, wherein the first light source comprises at least one first laser diode, and the second light source comprises at least one second laser diode.

17. The method of claim 13, wherein the first spectral range comprises a wavelength range of one of 380 nm to 780 nm, 570 nm to 780 nm, or 640 nm to 780 nm.

18. The method of claim 13, wherein the second spectral range lies within a wavelength range of one of 800 nm to 3 µm, 1 µm to 3 µm, 1.2 µm to 3 µm, or 2 µm to 3 µm.

19. The method of claim 13, wherein the deflection unit comprises one of a pivoting mirror, a rotating mirror, or a Risley prism assembly.

20. A device for signal light display and environment detection, comprising:
   a first light source configured to emit visible light in a first spectral range, and a second light source configured to emit invisible light in a second spectral range;
   a combined lighting and material layer within the device, configured to reflect and/or transmit light in the first spectral range in a diffused manner to form an automotive signal light and at least substantially transparent for light in the second spectral range to emit the invisible light for environment detection in an environment of the device;
   a deflection unit configured to deflect the visible light emitted from the first light source onto the combined lighting and material layer and deflect the invisible light emitted from the second light source onto the combined lighting and material layer; and
   a control unit configured to control the first light source to temporally modulate the visible light in order to display a pattern or symbol as a light signal on the combined lighting and material layer using the visible light deflected onto the combined lighting and material layer by the deflection unit.

* * * * *